United States Patent [19]
Jang

[11] Patent Number: 5,521,375
[45] Date of Patent: May 28, 1996

[54] METHOD AND APPARATUS FOR CONTROLLING THE OUTPUT LEVEL OF A SECOND HARMONIC GENERATOR BY TEMPERATURE COMPENSATION

[75] Inventor: Hyeon-Yong Jang, Seoul, Rep. of Korea

[73] Assignee: Samsung Electronics Co., Ltd., Suwon, Rep. of Korea

[21] Appl. No.: 321,708

[22] Filed: Oct. 12, 1994

[30] Foreign Application Priority Data

Nov. 11, 1993 [KR] Rep. of Korea .................. 93-23905

[51] Int. Cl.⁶ .................... H01J 7/24; H01J 40/14
[52] U.S. Cl. .............. 250/238; 250/214 C; 359/328
[58] Field of Search .................. 250/238, 214 R, 250/214 C; 359/328, 240; 369/121

[56] References Cited

U.S. PATENT DOCUMENTS

| | | | |
|---|---|---|---|
| 3,858,056 | 12/1974 | Melamed et al. ............... | 307/88.3 |
| 5,093,832 | 3/1992 | Bethune et al. ............... | 372/21 |
| 5,181,214 | 1/1993 | Berger et al. ............... | 372/34 |
| 5,185,643 | 2/1993 | Vry et al. ............... | 356/358 |
| 5,341,388 | 8/1994 | Masuda et al. ............... | 372/36 |

*Primary Examiner*—Edward P. Westin
*Assistant Examiner*—Stephen Calogero
*Attorney, Agent, or Firm*—Lowe, Price, LeBlanc & Becker

[57] ABSTRACT

A second harmonic generating method and apparatus is disclosed in which temperature of the nonlinear optical device is detected using a temperature sensor and the light output control is performed only when the temperature of the nonlinear optical device falls within a predetermined range through a comparison with a set temperature, so that the best peak can be selected. At no time is a different peak selected when the characteristics or operation conditions of the nonlinear optical device change.

5 Claims, 7 Drawing Sheets

METHOD AND APPARATUS FOR CONTROLLING THE OUTPUT LEVEL OF A SECOND HARMONIC GENERATOR BY TEMPERATURE COMPENSATION

BACKGROUND OF THE INVENTION

The present invention relates to a second harmonic generating method and apparatus for improving an unstable phenomenon of light output occurring by a non-linear optical device.

In a magneto-optical recording method for recording/reproducing data by using laser beam, an 830 nm-infrared semiconductor laser is being used. However, there is a difficulty in pursuing higher recording densities. In focusing, the 830 nm-semiconductor laser has a focal diameter over 830 nm, which hinders high-density recording. If the laser source has a shorter wavelength than 830 nm, its focal diameter can be reduced accordingly.

Such a short-wave laser source, comprising a helium-neon laser and an argon laser, is difficult to deal with because it is too large for commercial-use data recording and playback functions and consumes an excessive amount of power.

A second harmonic generator pumps a Nd:YAG crystal with an 809 nm-semiconductor laser which is small in volume and is thus easy to handle, and thereby forms a 1064 nm-laser source. The second harmonic generator uses a non-linear device made of KTP (specifically, $KTiOPO_4$ or potassium titanyl phosphate) or $KNbO_3$ so as to obtain a second harmonic (i.e., a 532 nm-laser which is half the wavelength of the 1064 nm-laser) with respect to the fundamental.

Since the second harmonic generator uses a nonlinear optical device being very sensitive to temperature fluctuations, its light output is unstable. A uniform laser output can be obtained only when the temperature is precisely controlled.

Referring to FIG. 1 showing a conventional apparatus, an 809 nm laser emitted from a laser diode 100 passes through a first mirror 102 and a Nd:YAG crystal 104 located inside a resonator between two mirrors 102 and 116, resulting in a laser resonance of a 1064 nm fundamental wave. Here, a Brewster plate 106 and a nonlinear optical device 110 are located between Nd:YAG crystal 104 and second mirror 116. A 532 nm second harmonic, which is half the wavelength of the fundamental, is generated from nonlinear optical device 110.

1064 nm- and 532 nm-light beams are mixed in the light beam proceeding to second mirror 116. However, second mirror 116 reflects the 1064 nm light and outputs only the 532 nm light because it has a high reflection rate with respect to the fundamental. Since part of the 1064 nm light remains in the light passing through the second mirror, a blocking plate 118 is located behind second mirror 116 so as to transmit the 532 nm light and interrupt the 1064 nm light. In order to use part of the 532 nm light output via blocking plate 118 in output light stabilization, a beam splitter 120 is provided behind blocking plate 118 so that part of the 532 nm light is input to a photodetector 122.

When the 532 nm laser beam (second harmonic) reaches photodetector 122, the beam is photoelectrically converted so as to become a current in proportion to the amount of input light. The current is input to a second harmonic light output controller 124.

A control signal output from second harmonic light output controller 124 is input to a thermo-electric cooler 112 so as to control the temperature of nonlinear optical device 110.

The configuration and operation of second harmonic light output controller 124 will be described below with reference to FIG. 2.

Second harmonic light output controller 124 is made up of an amplifier 200, a second harmonic light output setting portion 202, a comparator 204, an integrator 206, and thermo-electric cooler driving portion 208.

Here, since the back surface of nonlinear optical device 110 becomes very hot, a heat sink 114 is provided to spontaneously emit the heat of a high-temperature portion, thereby enhancing the efficiency of the thermo electric cooler and effectively controlling the temperature of a low-temperature portion.

The current from photodetector 122 for generating the current corresponding to the light output from nonlinear optical device 110 is input to amplifier 200 for the purpose of light output stabilization and is amplified therein to output a voltage, which is in turn input to comparator 204 for the comparison with a set voltage of second harmonic light output setting portion 202.

The comparison value of comparator 204, which is a light output offset signal to the set value of a light output, is integrated by integrator 206 so that thermo-electric cooler driving portion 208 drives thermo-electric cooler 112 and therefore controls the temperature of nonlinear optical device 110.

As a result, the control mechanism of the conventional second harmonic generator is designed to control the temperature of nonlinear optical device 110 with the harmonic light output therefrom.

FIG. 3 is a circuit diagram of the light output controller according to the conventional technology.

Referring to FIG. 3, light output comparator 608 is comprised of a photodiode PD1, resistors R1–R5, R7 and R8, a variable resistor VR1, and operational amplifiers OP1 and OP2.

Here, photodiode PD1 applies a voltage proportional to the light output amount from nonlinear optical device 110 to the inverting port of operational amplifier OP1. Operational amplifier OP1 amplifies the input signal and outputs the amplified signal to the inverting port of operational amplifier OP2. Operational amplifier OP2 compares the voltage signal output from operational amplifier OP1 and the voltage formed by resistors R7 and R8 and variable resistor VR1, thereby outputting a voltage corresponding to the difference between the two signals. To perform temperature control of nonlinear optical device 110, thermo-electric cooler driving portion 208 receives the integration signal from integrator 206 via the base of transistor TR1 and provides a driving current to thermo-electric cooler 112 in proportion to the integration signal.

FIG. 4 shows a graph indicating the relationship between temperature and light output of the nonlinear optical device, with several peaks of light output. In FIG. 4, for a stable output, the light output offset is negatively fed back until the light output set value set by second harmonic light output setting portion 202 is equal to an actually obtained light output.

The light output offset is applied to thermo-electric cooler 112 so as to lower the temperature of nonlinear optical device 110. In FIG. 4, at temperature $T_1$ which is the initial temperature of the nonlinear optical device, a negative feedback is performed to lower the temperature of nonlinear optical device 110 until the temperature thereof becomes temperature $T_2$ at which the second harmonic light output reaches the light output set value. Then, at the first peak, the light output increases and the temperature stops changing at the light output set value.

However, the first peak has a smaller maximum margin of light output than the second peak does. In other words, since it is hard for the light output to be uniformly maintained according to the nonlinear optical device and second harmonic generator, the second peak has a higher stability of light output than the first peak does.

As shown in FIG. 5A showing the variation of light output over time in the conventional harmonic generator, the temperature of the nonlinear optical device moves from $T_2$ to $T_3$. Here, there is created a light output unstable section B in which the light output is smaller than the light output set value. When the temperature continues to move toward $T_3$ via the light output unstable section and the light output becomes equal to the light output set value, the temperature of the nonlinear optical device stops changing.

However, as shown in FIG. 5B, for the light output unstable section, the variation amount of temperature over time is the highest in the nonlinear optical device. In other words, since the temperature control is performed via section A, unstable section B and stable section C, the light output profile contains unstable sections.

SUMMARY OF THE INVENTION

Therefore, it is an object of the present invention to provide a second harmonic generating method and apparatus for generating a stable light output.

To accomplish the object of the present invention, there is provided a second harmonic generating method for detecting the amount of harmonic light output and controlling the temperature of a nonlinear optical device through a comparison with a set light output value so as to obtain a uniform light output, wherein a light output control with the amount of light output is performed only when the temperature of the nonlinear optical device is detected and the detected temperature falls within a predetermined range through a comparison with a set temperature value, so as to output only stable second harmonic light output.

To accomplish the object of the present invention, there is provided a second harmonic generating apparatus comprising: a nonlinear optical device for generating a light output; a thermo-electric cooler attached to the nonlinear optical device for controlling the temperature of the nonlinear optical device; a photo-electric converter for converting the light output from the nonlinear optical device into a current signal; a temperature sensor attached to the nonlinear optical device for sensing temperature with the resistance varying in accordance with temperature; a light output comparator for receiving the current signal from the photoelectric converter, detecting the amount of light output, and outputting a first comparison signal between the detected amount of light output and a predetermined a light output set value; a temperature comparator for detecting temperature by using the variation of the resistance of the temperature sensor, and outputting a second comparison signal between the detected temperature and a predetermined set temperature value; temperature range deciding means for receiving the second comparison signal and, when the second comparison signal falls within a predetermined range, outputting a first control signal, and when the second comparison signal falls outside the predetermined range, outputting a second control signal; output selecting means for selecting the first comparison signal in response to the first control signal, and the second comparison signal in response to the second control signal, and outputting a voltage proportional to the selected signal; and a thermo-electric cooler driving portion for driving the thermo electric cooler by providing a driving voltage linearly according to the voltage input via the output selecting means.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 6:
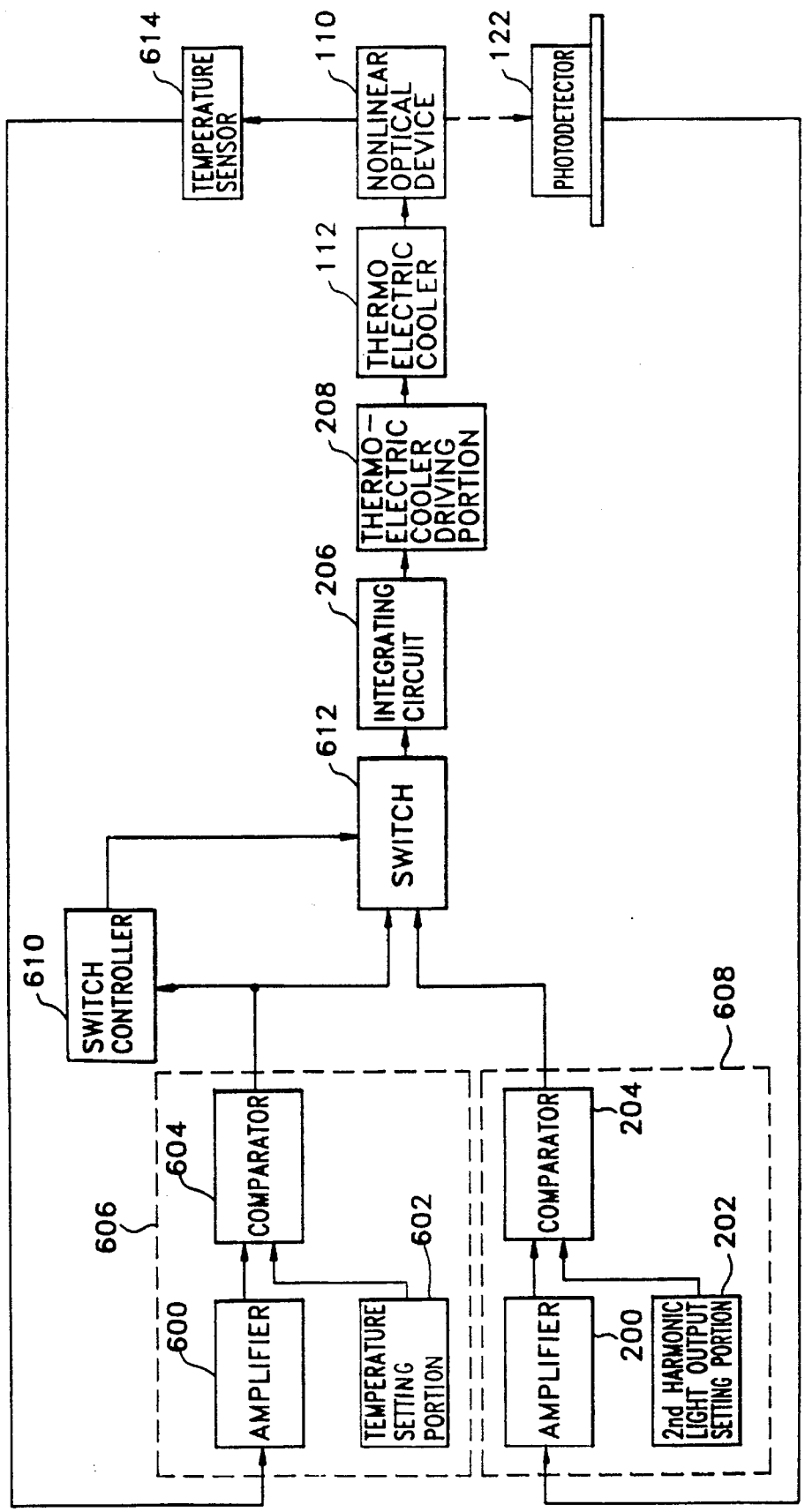
FIG. 6 is a schematic block diagram of a light output controller of the present invention.

Referring to FIG. 6, a light output controller of the present invention further comprises a temperature comparator, a switch controller, a switching means and a temperature sensor, in addition to the light output comparator, integrating circuit, electronic refrigerator driving portion and photodetector all of which are components of the conventional apparatus.

According to the configuration of the present invention, switch controller 610 initially selects a temperature comparison signal in accordance with a measured value from temperature sensor 614. The 1064 nm laser output from Nd:YAG crystal 104 passes through nonlinear optical device 110. Then, the 532 nm second harmonic is generated therefrom. Here, for temperature sensor 614, a thermistor is mainly used in which resistance varies with respect to temperature. This variation in resistance is converted into voltage and then amplified in amplifier 600. Then, in comparator 604, the amplified voltage is compared with the voltage by a set temperature from temperature setting portion 602.

The difference between the amplified measured temperature and the set temperature becomes a temperature offset. This offset is integrated by integrator 206 and applied to thermo-electric cooler 208. The thermo-electric cooler 208 is driven to cool nonlinear optical device 110.

Figure 7:
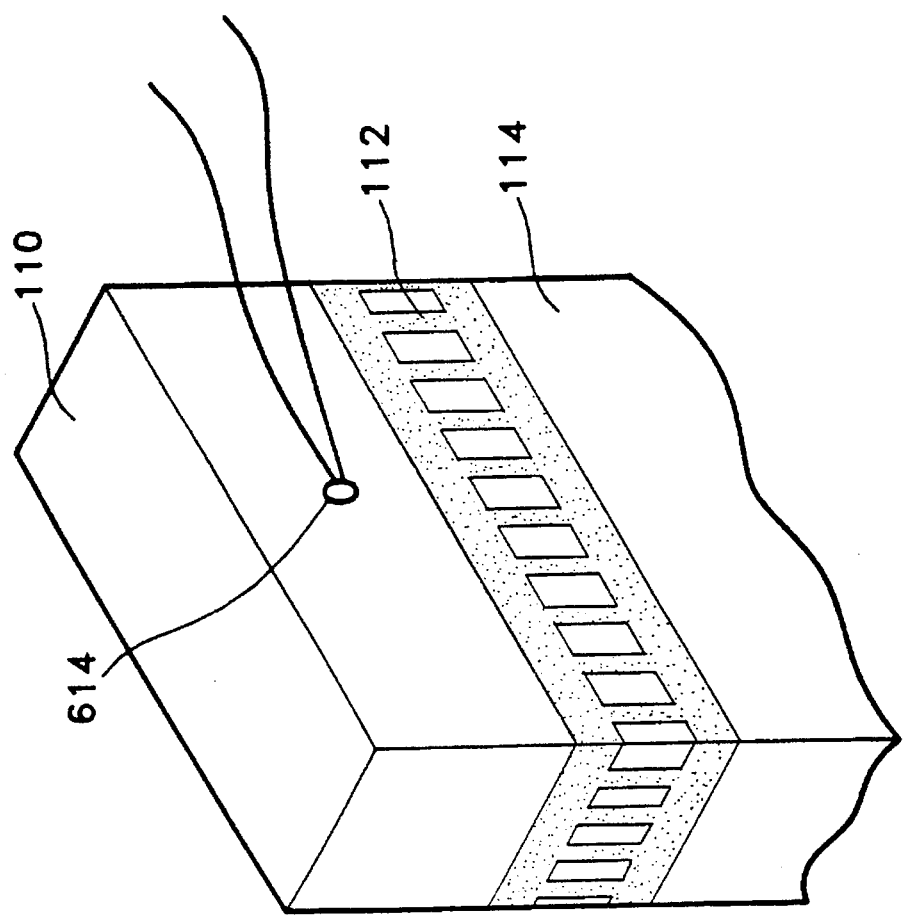
FIG. 7 is a perspective view of the nonlinear optical device to which a temperature sensor of the present invention is attached.

As shown in FIG. 7, temperature sensor 614, attached to the nonlinear optical device, repeats its operation until the temperature comparison signal, which is the difference between the measured temperature fed back to thermoelectric cooler 112 and the set temperature, becomes zero, in other words, until the temperature offset becomes zero. As a result, the absolute value of the temperature comparison signal is maintained at zero.

Figure 1:
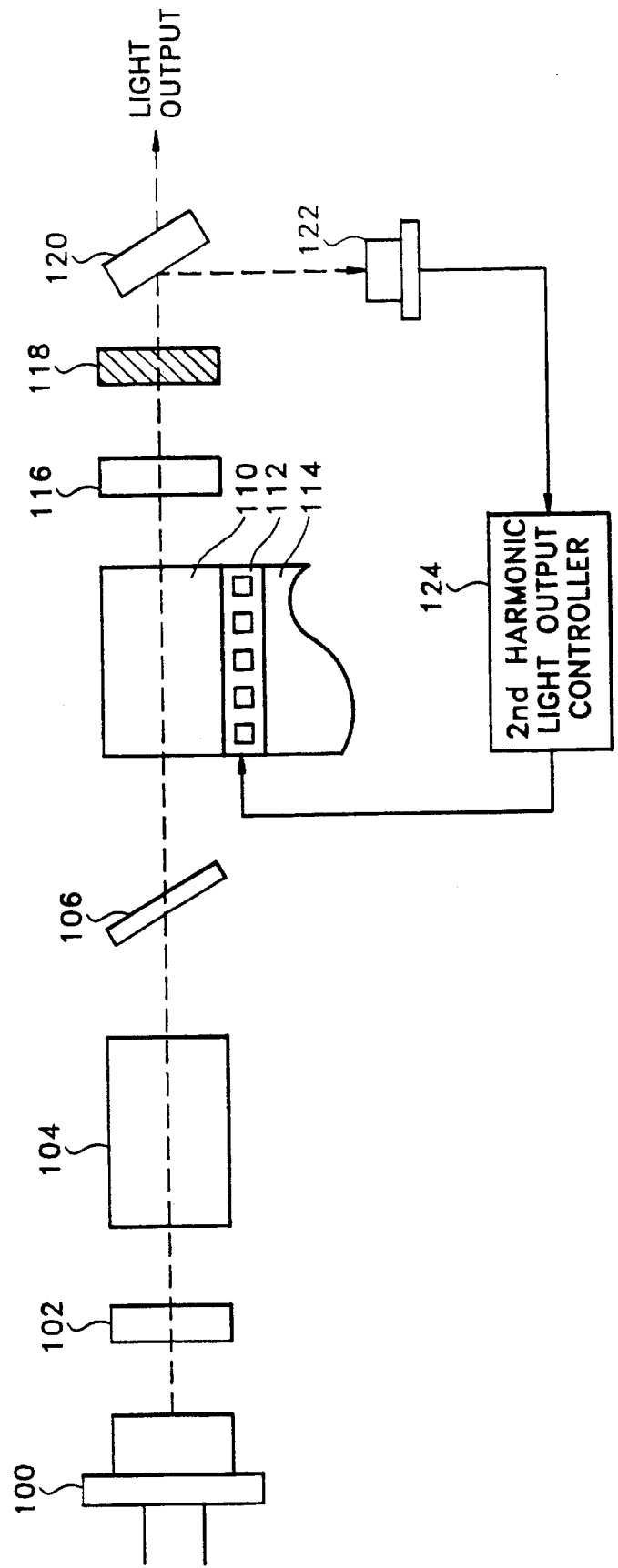
FIG. 1 illustrates a configuration of the conventional second harmonic generator.
Figure 2:
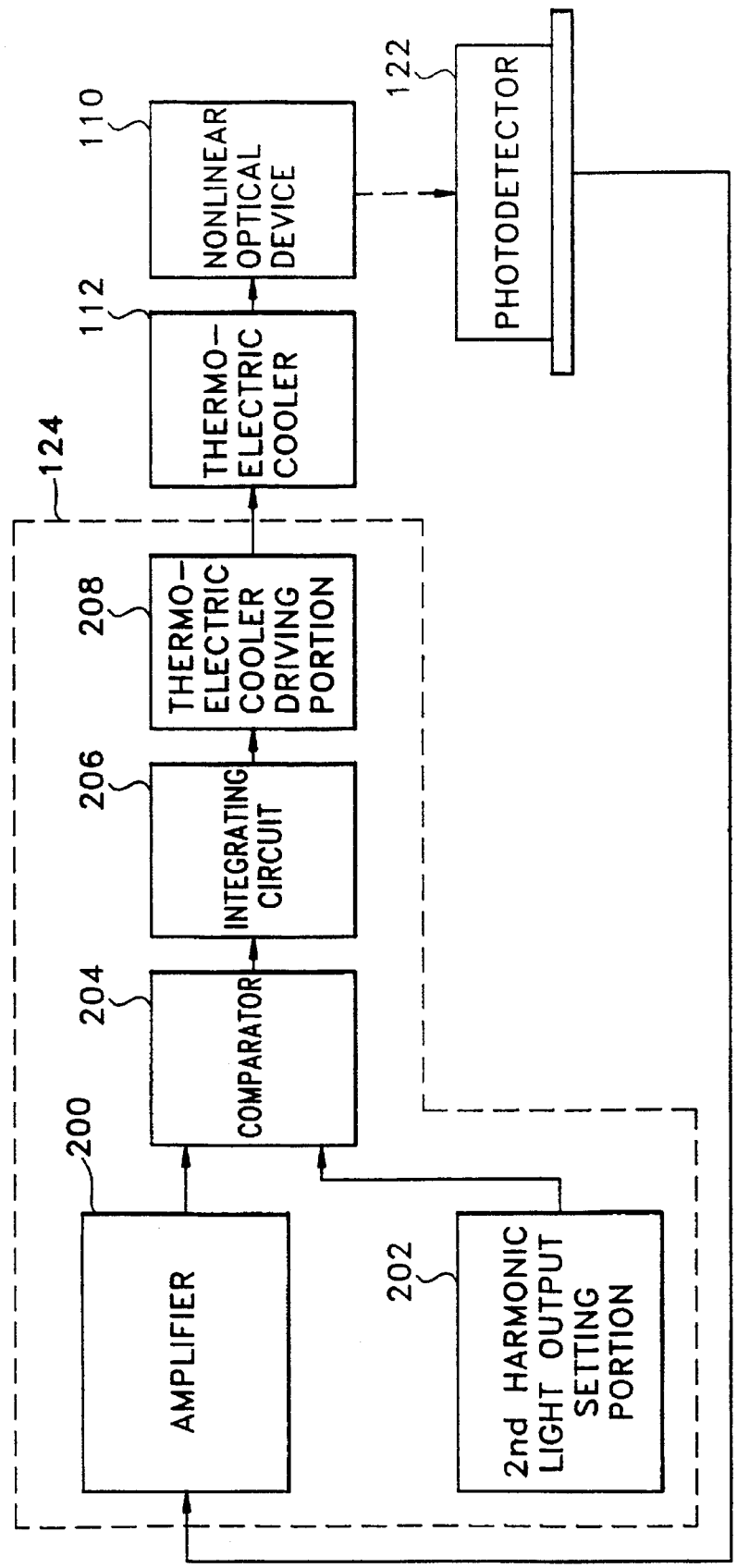
FIG. 2 is a block diagram of a conventional light output controller.
Figure 3:
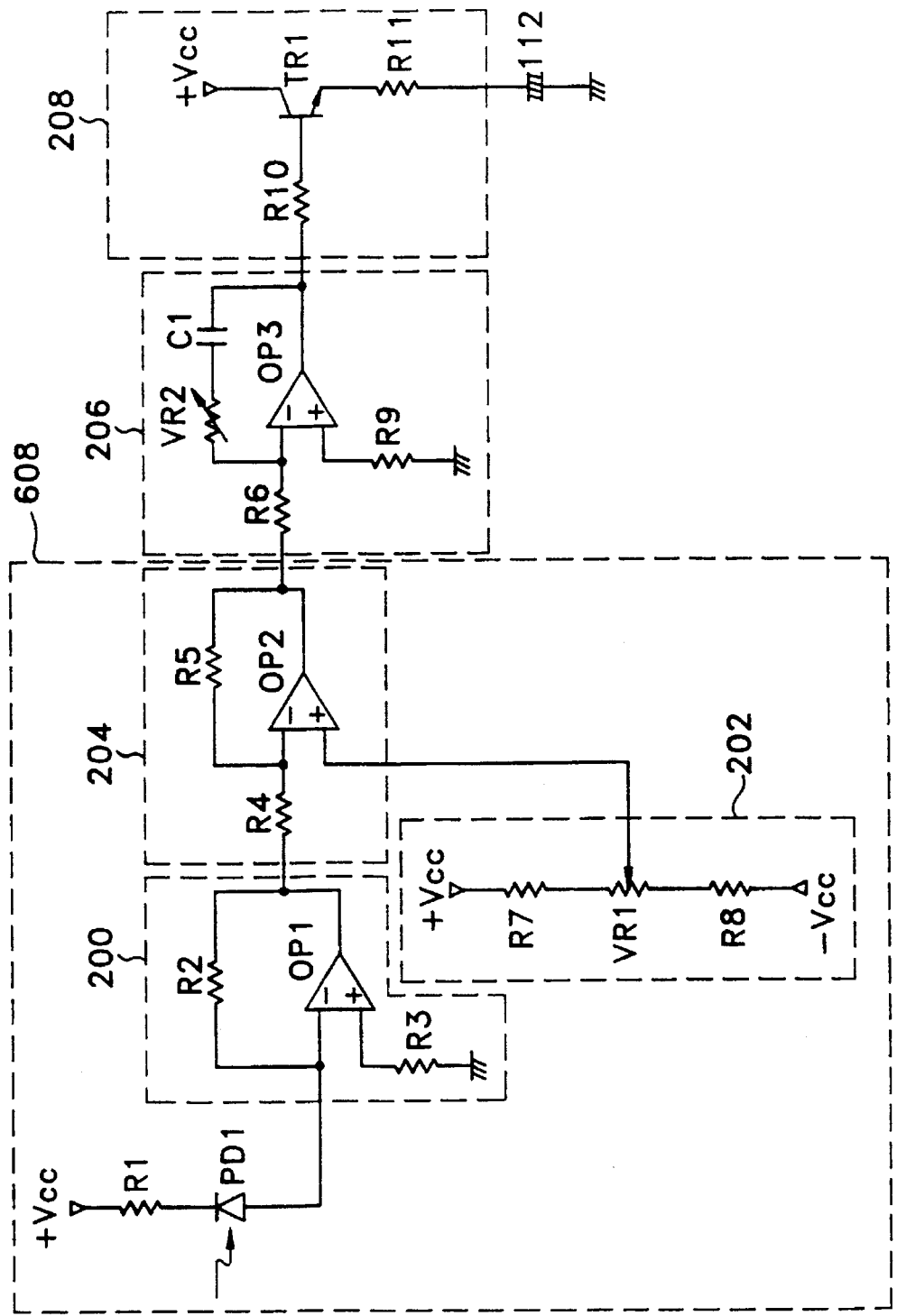
FIG. 3 is a circuit diagram of the light output controller according to the conventional technology.
Figure 4:
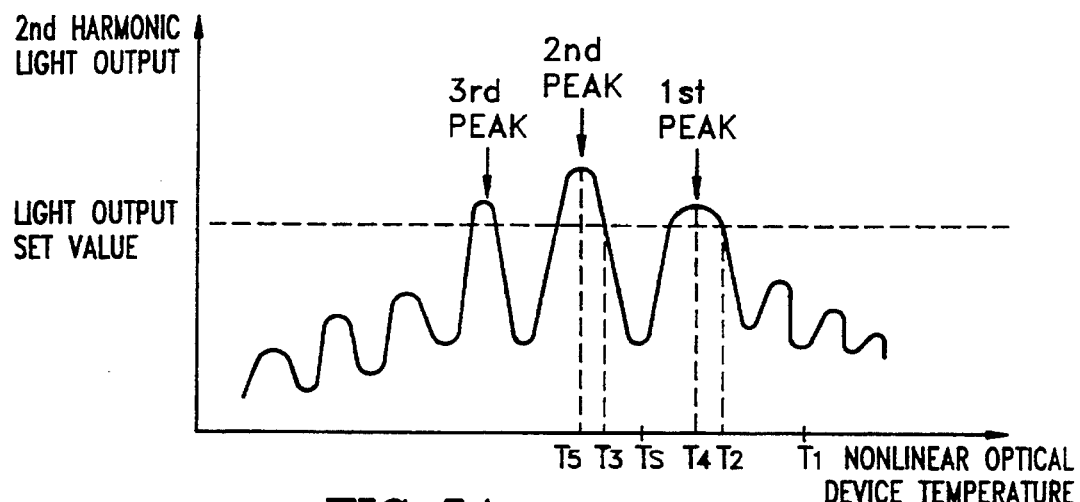
FIG. 4 is a graph of light output with respect to temperature.

Here, when the wavelength of the input light is uniformly 1064 nm, the output characteristic of the second harmonic has several peaks according to temperature, as shown in FIG. 4. In order to select the second harmonic having the best output characteristic, the set temperature of nonlinear optical device 110 should be $T_S$ which lies between the first and second peaks.

When the absolute value of the temperature comparison signal of comparator 604 approximates zero, switch controller 610 sends a control signal to switch 612 and receives a signal from photodetector 122 so as to control the second harmonic light output to be the predetermined light output value set by the second harmonic light output setting portion 202. This procedure is newly introduced in the present invention, whereas there was only the negative control of the second harmonic light output in the conventional technology.

The light output control method and apparatus of the present invention further comprises a controlling step for controlling the second harmonic output by setting a temperature and a switching step for switching to perform the control of light output when the temperature of the nonlinear optical device is controlled.

Figure 5A:
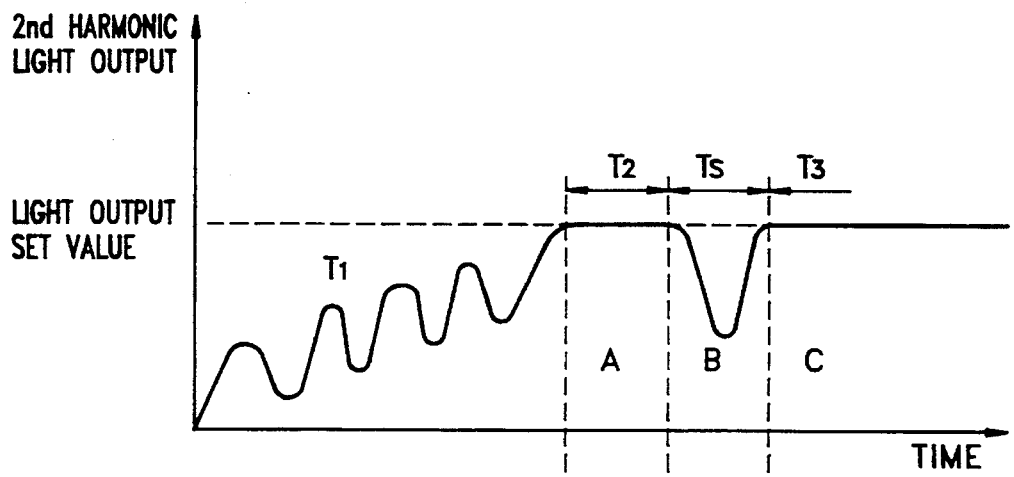
FIG. 5A is a graph of light output with respect to time according to the conventional technology.
Figure 5B:
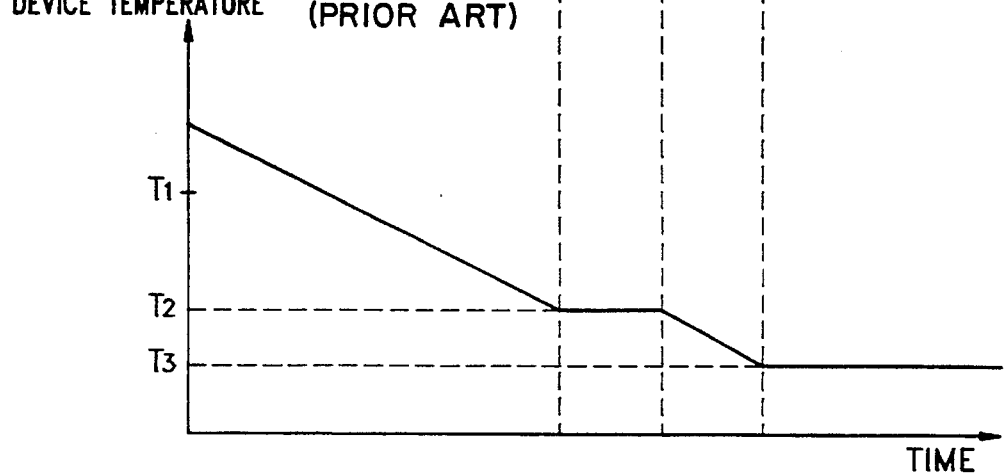
FIG. 5B is a graph of temperature variation of the nonlinear optical device with respect to time according to the conventional technology.

Referring to FIG. 5A, in the conventional technology, the light output is controlled sequentially via section A, unstable section B, and section C. However, in this invention, the temperature of the nonlinear optical device is set to $T_S$, and the control between first peak temperature $T_4$ and second peak temperature $T_5$ is performed using the light output from the photodetector so that the control flow runs directly through unstable section B and section C.

Figure 8:
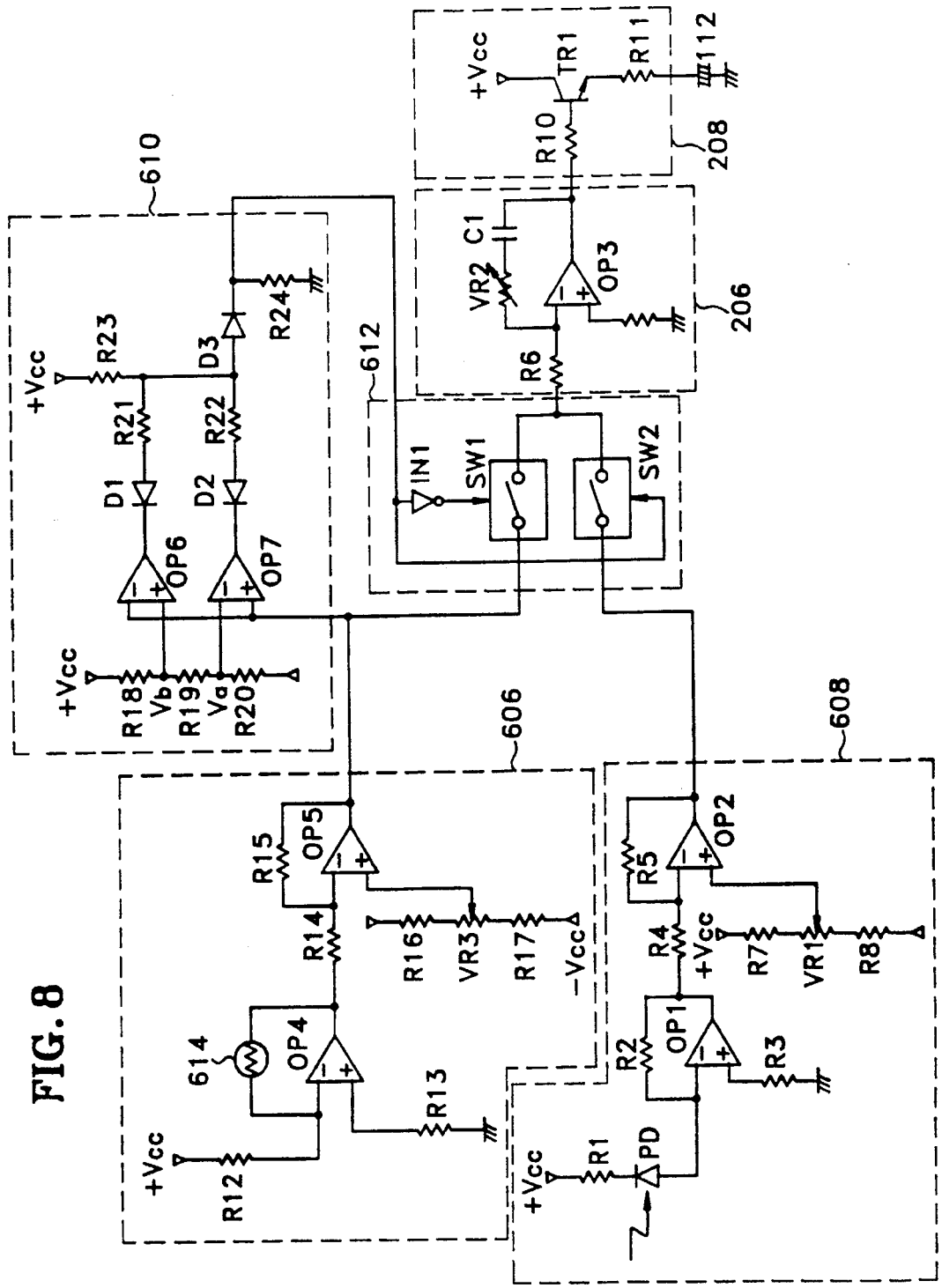
FIG. 8 is a circuit diagram of one embodiment of the light output controller of the present invention.

Referring to FIG. 8, light output comparator 608 is comprised of a photodiode PD1, resistors R1–R5, R7 and R8, a variable resistor VR1, and operational amplifiers OP1 and OP2.

Here, photodiode PD1 inputs a voltage proportional to the light output amount from nonlinear optical device 110 at the inverting port of operational amplifier OP1. Operational amplifier OP1 amplifies and outputs the input signal to the inverting port of operational amplifier OP2. Operational amplifier OP2 compares the voltage signal output from operational amplifier OP1 and the voltage formed by resistors R7 and R8 and variable resistor VR1, thereby outputting a voltage corresponding to the difference between the two signals. The output voltage is coupled to one port of switch SW2.

Temperature comparator 606 comprises a temperature sensor 614, resistors R12–R17, a variable resistor VR3, and operational amplifiers OP4 and OP5.

Here, temperature sensor 614, attached to the nonlinear optical device, enables temperature detection as its resistance varies in accordance with temperature. The variable resistance value of temperature sensor 614 is used as the input impedance of operational amplifier OP4 so that a voltage amplified according to the resistance value is output. The output voltage is input to the inverting port of operational amplifier OP5 and is compared with a voltage formed by resistors R16 and R17 and variable resistor VR3 and input via the non-inverting port thereof. The operational amplifier OP5 outputs the difference between the two signals.

Switch controller 610 is made up of resistors R18–R24, diodes D1–D3, and operational amplifiers OP6 and OP7.

The output signal of operational amplifier OP5 is input to the inverting port of operational amplifier OP6 and the non-inverting port of operational amplifier OP7. Operational amplifier OP6 receives a voltage formed by the series connection of resistors R19 and R20 via its non-inverting port, and compares the received voltage signal with the output signal of operational amplifier OP5. Here, if the output voltage of operational amplifier OP5 input via its inverting port is higher than a reference voltage input via its non-inverting port, a negative saturation voltage is output. Otherwise, a positive saturation voltage is output.

Similarly, operational amplifier OP7 receives a voltage formed by resistor R20 via the inverting port thereof and compares the received voltage signal with the output signal of operational amplifier OP5. Here, if the output voltage of operational amplifier OP5 input via its non-inverting port is higher than a reference voltage input via its inverting port, a positive saturation voltage is output. Otherwise, a negative saturation voltage is output.

Switch controller 610 outputs a control signal for controlling switching means 612 according to the output of operational amplifier OP5. The ON/OFF operation of switching means 612 in accordance with the output of operational amplifier OP5 is given in the following table.

| OP5 output | D1 | D2 | SW1 | SW2 |
| --- | --- | --- | --- | --- |
| below Va | interrupted | conducted | ON | OFF |
| between Va and Vb | interrupted | interrupted | OFF | ON |
| over Vb | conducted | interrupted | ON | OFF |

Here, according to circuitry analysis of the present invention, Va and Vb can be defined as follows.

$$Va = \frac{2VccR20}{R18 + R19 + R20}$$

$$Vb = \frac{2Vcc(R19 + R20)}{R18 + R19 + R20}$$

Here, section B of FIG. 5A is set using Va and Vb. By doing so, the stable light output of section C corresponding to the second peak is controlled, without the light output control being initialized at section A with respect to the light output set value. This allows to obtain a more stable light output.

In view of the temperature of the nonlinear optical device, in order to control light output with the light output set value only when the temperature of the nonlinear lies between $T_5$ and $T_4$, switch controller 610 outputs a control signal for turning on switch SW2. This implies that the temperature control is performed so that the temperature of the nonlinear optical device becomes a set point of the second harmonic light output, because the output signal of operational amplifier OP2 is input to integrator 206 and provides a voltage for driving thermo-electric cooler 112.

Switching means 612 outputs the output signal of operational amplifier OP2 or the output signal of operational amplifier OP5 in response to the control signal from switch controller 610.

Integrator 206 integrates the output signal of switching means 612 over time.

To perform temperature control of nonlinear optical device 110, thermo-electric cooler driving portion 208 receives the integration signal from integrator 206 via the base of transistor TR1 and provides driving current to thermo-electric cooler 112 in proportion to the integration signal.

In this invention, since the temperature of the nonlinear optical device is detected using a temperature sensor and the light output control is performed only when the temperature of the nonlinear optical device falls within a predetermined range through a comparison with a set temperature, the best peak can be selected. At no time is a different peak selected when the characteristics or operation conditions of the nonlinear optical device change.

Further, since a peak which contains noise is not useful as a light source, a noise-free peak can be intentionally selected.

What is claimed is:

1. A method for controlling the output level of a second harmonic generator by temperature compensation which comprises:

detecting a level of second harmonic output and a temperature of a non-linear optical device;

comparing said detected second harmonic output level with a predetermined value, and outputting the result of said comparison as a first comparison signal;

comparing said detected temperature of the non-linear optical device with a predetermined temperature range, and outputting the result of said comparison as a second comparison signal;

receiving said second comparison signal and generating a control signal only when the temperature of the nonlinear optical device is within said predetermined temperature range; and selecting either said first comparison signal or said second comparison signal in response to said control signal, and outputting a voltage to said non-linear optical device which voltage is proportional to the selected signal so as to control the temperature of said nonlinear optical device.

2. A method for controlling the output level of a second harmonic generator as claimed in claim 1, wherein said predetermined temperature range is from a second peak temperature at which a peak of the second harmonic light output is a maximum, to a first peak temperature at which a peak of the second harmonic light output is next to the maximum peak.

3. A second harmonic generating apparatus comprising:

a nonlinear optical device for generating a light output;

a thermo-electric cooler attached to said nonlinear optical device for controlling a temperature of said nonlinear optical device;

a photo-electric converter for converting a light output from said nonlinear optical device into a current signal;

a temperature sensor attached to said nonlinear optical device for sensing temperature of said nonlinear optical device, said temperature having a resistance which varies in accordance with temperature;

a light output comparator for receiving said current signal from said photoelectric converter, detecting an amount of light output, and outputting a first comparison signal which is between the detected amount of light and a predetermined light output set value;

a temperature comparator for detecting temperature by using a variation of resistance of said temperature sensor, and outputting a second comparison signal which is between the detected temperature and a predetermined set temperature value;

temperature range deciding means for receiving said second comparison signal and, when said second comparison signal falls within a predetermined range, outputting a first control signal, and when said second comparison signal falls outside the predetermined range, outputting a second control signal;

output selecting means for selecting said first comparison signal in response to said first control signal, and second comparison signal in response to said second control signal, and outputting a voltage which is proportional to the selected signal; and a thermo-electric cooler driving means for driving said thermo-electric cooler by providing a driving voltage linearly according to the voltage input via said output selecting means.

4. A second harmonic generating apparatus as claimed in claim 3, wherein said temperature comparator comprises:

amplifying means for amplifying a voltage signal in accordance with temperature by using the resistance to the temperature of said temperature sensor as an output impedance; and comparing means for comparing said voltage signal with a predetermined voltage and outputting the compared value.

5. A second harmonic generating apparatus as claimed in claim 3, wherein said output selecting means comprises:

switching means for outputting said first comparison signal in response to said first control signal, and outputting said second comparison signal in response to said second control signal; and a proportional integrator for receiving a signal transmitted via said switching means and outputting an integrating amount with respect to said signal.

* * * * *